United States Patent [19]

Albrecht et al.

[11] Patent Number: 5,296,787
[45] Date of Patent: Mar. 22, 1994

[54] METHOD FOR REGULATING A MOTOR CURRENT OF A BRUSHLESS D.C. MOTOR

[75] Inventors: Kai Albrecht, Heidelberg; Helmut Meyer, Weinheim, both of Fed. Rep. of Germany

[73] Assignee: Heidelberger Druckmaschinen AG, Heidelberg, Fed. Rep. of Germany

[21] Appl. No.: 2,125

[22] Filed: Jan. 7, 1993

Related U.S. Application Data

[63] Continuation of Ser. No. 748,329, Aug. 21, 1991, abandoned.

[30] Foreign Application Priority Data

Aug. 21, 1990 [DE] Fed. Rep. of Germany ....... 4026366
Jul. 22, 1991 [DE] Fed. Rep. of Germany ....... 4124240

[51] Int. Cl.$^5$ .............................. H02P 7/06; H02P 6/02
[52] U.S. Cl. .................................... 318/433; 318/254; 388/819
[58] Field of Search ............... 318/138, 254, 439, 293, 318/375, 376, 430, 432, 433; 388/816, 819

[56] References Cited

U.S. PATENT DOCUMENTS

| | | | |
|---|---|---|---|
| 3,956,678 | 5/1976 | Byrne et al. | 318/138 |
| 4,250,435 | 2/1981 | Alley et al. | 318/138 |
| 4,350,943 | 9/1982 | Pritchard | 318/696 |
| 4,409,524 | 10/1983 | Nielsen et al. | 318/138 |
| 4,544,868 | 10/1985 | Murty | |
| 4,558,264 | 12/1985 | Weischedel | 318/254 |
| 4,562,386 | 12/1985 | Goff et al. | 318/254 |
| 4,563,619 | 1/1986 | Davis et al. | 318/138 |
| 4,628,231 | 12/1986 | Radziwill et al. | 318/138 |
| 4,698,563 | 10/1987 | Ban | 318/254 |
| 4,701,683 | 10/1987 | Kikkawa | 318/254 |
| 4,730,150 | 3/1988 | Lee et al. | 318/254 |
| 4,782,272 | 11/1988 | Buckley et al. | 318/254 |
| 4,851,763 | 7/1989 | Grëtzmacher et al. | |
| 5,063,338 | 11/1991 | Capel et al. | 318/685 |
| 5,109,184 | 4/1992 | Bahn | 318/254 |

FOREIGN PATENT DOCUMENTS

0206212 12/1986 European Pat. Off. .
3525210 1/1986 Fed. Rep. of Germany .
3708892 9/1988 Fed. Rep. of Germany .

Primary Examiner—Bentsu Ro
Attorney, Agent, or Firm—Herbert L. Lerner; Laurence A. Greenberg

[57] ABSTRACT

A method for regulating a motor current in phase windings of a brushless d.c. motor, wherein current is applied to the phase windings individually via an electronically controllable, d.c.-voltage intermediate-circuit converter with switchable semiconductor valves and respective freewheeling diodes connected in parallel with each thereof in individual bridge arms, and an actual value of the motor current is measured exclusively in the d.c.-voltage intermediate circuit, includes switching off, in a motor mode of operation, only one switchable semiconductor valve of the energized bridge arms for a period of time dependent upon the rotational speed of the motor when a reference value of the motor current is reached.

10 Claims, 10 Drawing Sheets $I_M = I_{IC}$

METHOD FOR REGULATING A MOTOR CURRENT OF A BRUSHLESS D.C. MOTOR

This application is a continuation of application Ser. No. 748,329, filed Aug. 21, 1991, now abandoned.

The invention relates to a method for regulating a motor current in phase windings of a brushless d.c. motor, wherein a current is applied to the phase windings individually via an electronically controllable, d.c.-voltage intermediate circuit converter with switchable semiconductor valves and respective freewheeling diodes connected in parallel with each thereof in individual bridge arms, and an actual value of the motor current is measured exclusively in the d.c.-voltage intermediate circuit.

Because brushless d.c. motors are distinguished by high dynamic performance and good controllability, they are being increasingly used in drive engineering. However, powering of the motors over a wide rotary-speed range, especially in the direction of low rotational or rotary speeds, has proved to be problematic. In order to ensure a gentle, smooth start of a brushless d.c. motor, German Published, Non-Prosecuted Application (DE-OS) 35 25 210 has proposed the following control circuit: when a given comparative value is reached, excitation of the stator windings is interrupted for a previously fixed period of time by means of a pulse-duration modulation unit. Due to the variation in the reduction times as well as in the build-up times of the motor current, the stator windings are excited by a pulse-duration modulated voltage of which the frequency and switch-on rates are higher in the range of low rotational speeds than in the range of high rotational speeds.

However, the drive circuit described in DE-OS 35 25 210 can be used advantageously for only as long as the driven motor runs at a fixed final speed during operation. The period of time for the interruption of the motor current is optimally determined according to this speed, the term "optimally" meaning that the period of time is measured so that the motor current dips and, therefore, the torque fluctuations are as small as possible. In order to achieve this, the period of time selected for interruption of the motor current must be appropriately short depending upon the final rotational speed. In the lower speed range, this leads automatically to extremely short interruption times for the motor current or to a very high switching frequency for the power transistors of the converter. As a result of the high switching load to which the power transistors are subjected, the service life thereof becomes shortened. If, on the other hand, the period of time for interruption of the motor current is adjusted to a rotational speed in the intermediate speed range in order to reduce this high switching rate of the power transistors in the lower rotational speed range, this results in sharp motor current dips and therefore a large amount of torque ripple in the upper speed range. Consequently, the solution proposed in DE-OS 35 25 210 can be used for the special application described therein, but it does not work satisfactorily if the rotational speed is to be regulated with great accuracy over a broad range of speed, as is the case, for example, when driving printing machines. In the latter case, care must be taken to ensure that torque fluctuations are largely suppressed at all printing speeds, for they cause register errors and therefore lead to the printing of waste sheets.

It is accordingly an object of the invention to provide a method for regulating the motor current in brushless d.c. motors, while exclusively utilizing a "single" current measuring device in the intermediate circuit, for the purpose of reducing to a minimum the ripple in the motor current, as well as the clock frequency for applying current to the phase windings.

With the foregoing and other objects in view, there is provided, in accordance with the invention, a method for regulating a motor current in phase windings of a brushless d.c. motor, wherein current is applied to the phase windings individually via an electronically controllable, d.c.-voltage intermediate-circuit converter with switchable semiconductor valves and respective freewheeling diodes connected in parallel with each thereof in individual bridge arms, and an actual value of the motor current is measured exclusively in the d.c.-voltage intermediate circuit, which comprises switching off, in a motor mode of operation, only one switchable semiconductor valve of the energized bridge arms for a period of time dependent upon the rotational speed of the motor when a reference value of the motor current is reached.

Due to the fact that only one semiconductor valve is switched off in the motor mode of operation when the reference value of the motor current is reached, a lesser amount of current ripples is attained. Accordingly, power dissipation and, therefore, heating of the semiconductor valves, which are usually power transistors, are reduced, which has a positive effect upon the service life of the transistors.

A further advantage offered by the method according to the invention is the considerable reduction in motor noise during motor operation, i.e. the normal purpose of the motor. The reason for the noise reduction is that, when only one of the two power transistors of the energized bridge arms is switched off, the voltage applied to the motor is reduced by half: the clocked phase winding is then subjected either to 0-volt potential or the operation voltage $U_B$ of the d.c. voltage source. Furthermore, the effective current in the capacitor is also advantageously reduced.

Whereas only one switchable semiconductor valve of the bridge arms subjected to current is clocked in the motor mode of operation, in accordance with another mode of the method according to the invention, the method includes switching off, in a generator mode of operation, both switchable semiconductor valves in the energized bridge arms, when the reference value of the motor current is reached. As an alternative to the determination of the speed-dependent period of time for interrupting the motor current, current regulation can be performed by means of a two-step current regulator because, in the generator mode of operation, the current flowing back to the voltage source is measured by the single current measuring device in the d.c.-voltage intermediate circuit and, therefore, the motor current is thus also known during the current reduction.

In accordance with a further mode, the method according to the invention includes switching on, in a generator mode of operation, only one of the switchable semiconductor valves of the energized bridge arms for another period of time dependent upon the rotational speed of the motor. Whereas, in the motor mode of operation, the current reduction is not measured because of the "single" current measurement by the measuring device in the d.c.-voltage intermediate circuit, in the generator mode of operation, there is a problem in that the motor current is not measured with the single current measuring device in the intermediate circuit during the current build-up. Due to the fact that only one semiconductor valve is switched on, the power dissipation and therefore the heating of the semiconductor valves is also reduced in the generator mode of operation; this has a positive effect upon the service life of the semiconductor valves and also results in a considerable reduction in the motor noise in the generator operating mode. In applications wherein one of the motors constantly works in the generator operating mode, a loud and disturbing drive noise is noticeable. This mode of the method invention helps to reduce this noise considerably.

The duration of the switched off time of a semiconductor valve in the motor operating mode, or of the switched-on time of a semiconductor valve in the generator operating mode, is not only dependent upon the speed of the motor but also, in accordance with an added mode of the method invention, on other parameters, for example the inductance of the motor, the resistance of the motor, the motor temperature, the difference between the reference value and the actual value of the current, and the voltage in the intermediate circuit.

As described hereinabove, in the generator mode of operation, the motor current cannot be measured in the d.c.-voltage intermediate circuit during current build-up. According to a development of the method according to the invention, it is proposed that the on-time after the motor has been started or during each commutating operation is calculated in such a manner that the first measurable actual value of the motor current, which can only be measured in the d.c. voltage intermediate circuit once the current reduction has been introduced, is approximately equal to the reference value of the motor current, and should normally be smaller than the reference value of the motor current.

In accordance with an additional mode of the method according to the invention, the switchable semiconductor valve of the energized bridge arm is switched off for a minimum off-time if the lower limit value of the motor current is not reached after expiration of the on-time. This minimum off-time should at least be equal to the hold-off interval of the relevant semiconductor valve. Due to this measure, the switchable semiconductor valve, which would otherwise be immediately switched on again if the reference value of the motor current were not reached, is prevented from being subjected to a load which is too high.

In accordance with yet another mode, the method according to the invention includes switching off, at the expiration of the other period of time, the switchable semiconductor valve of the energized bridge arms, storing the actual value of the motor current measured in the intermediate circuit, comparing the actual value of the motor current with a reference value of the motor current and, when the actual value and the reference value of the motor current are different, determining a correction value and including it in a calculation of a subsequent corrected on-time period of the switchable semiconductor valve of the energized bridge arms. With this measure of the method, by appropriate calculation of the switched-on time, the lower limit value is attained as the starting point for the succeeding switched-on time.

The instant the previously-fixed lower limit value is reached, the switchable semiconductor valve of the energized bridge arms is switched on for the corrected period of time. From this point in time, assurance is provided that, in the generator operating mode also, the switchable semiconductor valve is switched on for a period of time adapted to the respective applicable parameters.

A critical aspect in this method is the commutation point between the generator operating mode and the motor operating mode. According to yet a further mode of the method of the invention, the commutation point does not correspond with the rotational speed $n=0$ min$^{-1}$, but corresponds with a lower speed in the generator operation mode. By this means, assurance is provided that, in the generator mode of operation also, current conduction in the motor occurs at the rotational speed $n=0$ min$^{-1}$.

In order to reduce the load on the semiconductor valves further, in accordance with yet an added measure, the method includes, during respective commutations, alternately switching off and switching on the switchable semiconductor valves of the energized bridge arms for respective motor and generator modes of operation.

In accordance with a concomitant mode, there is provided a method wherein respective first, and second pairs of the bridge arms are connected in parallel, and which includes alternately building-up the current via a first circuit including a transistor of one of the bridge arms and a diode of the other of the bridge arms of the first pair of bridge arms, and via a second circuit including a transistor of one of the bridge arms and a diode of the other of the bridge arms of the second pair of bridge arms. This results in an even loading of the semiconductor valves of the converter.

Other features which are considered as characteristic for the invention are set forth in the appended claims.

Although the invention is illustrated and described herein as embodied in a method for regulating a motor current of a brushless d.c. motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 6A:
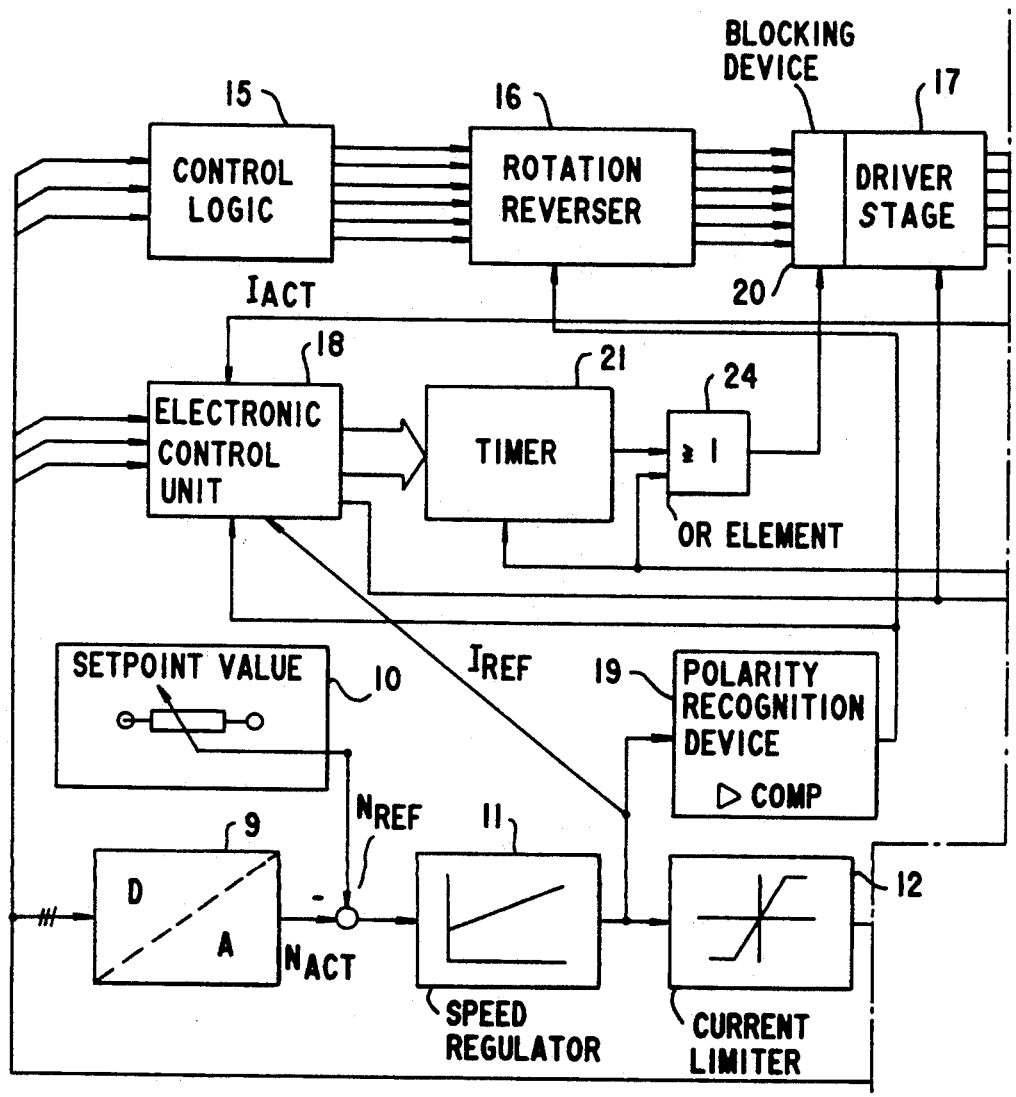
Figure 6B:
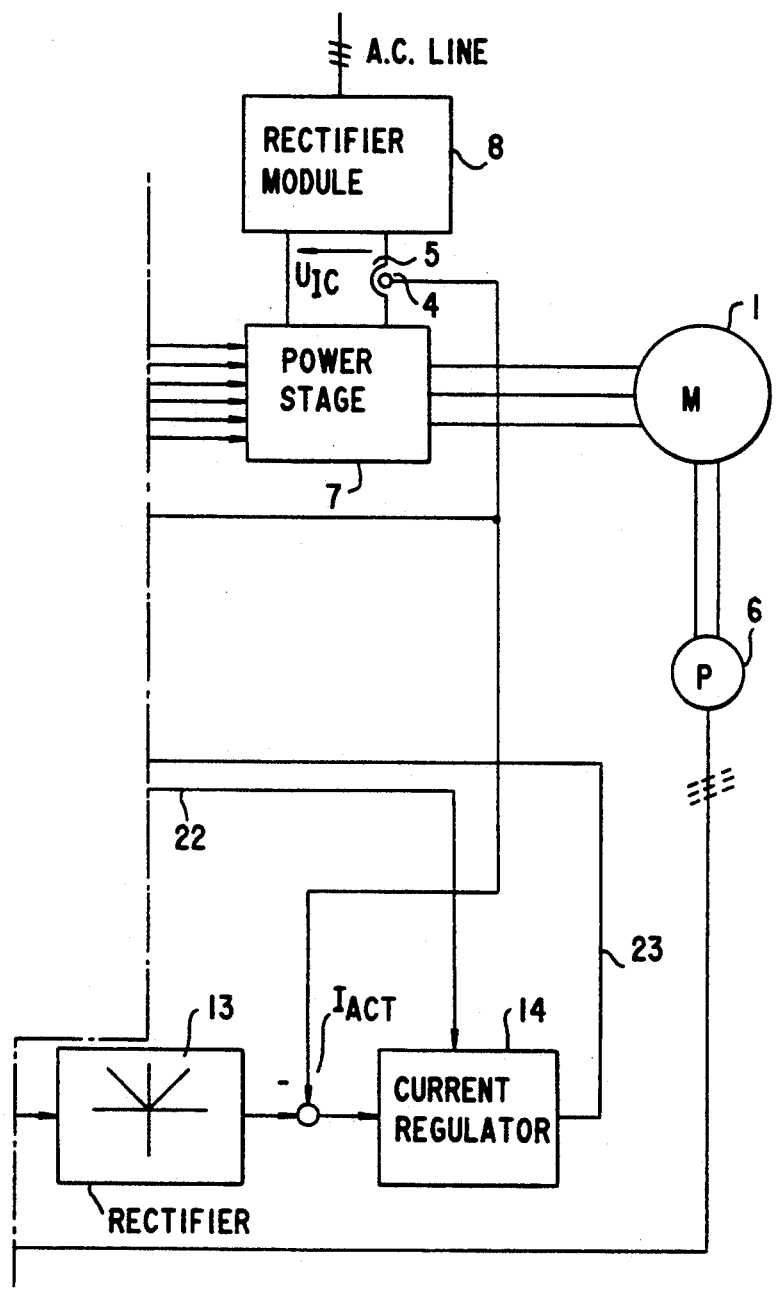
Figure 7:
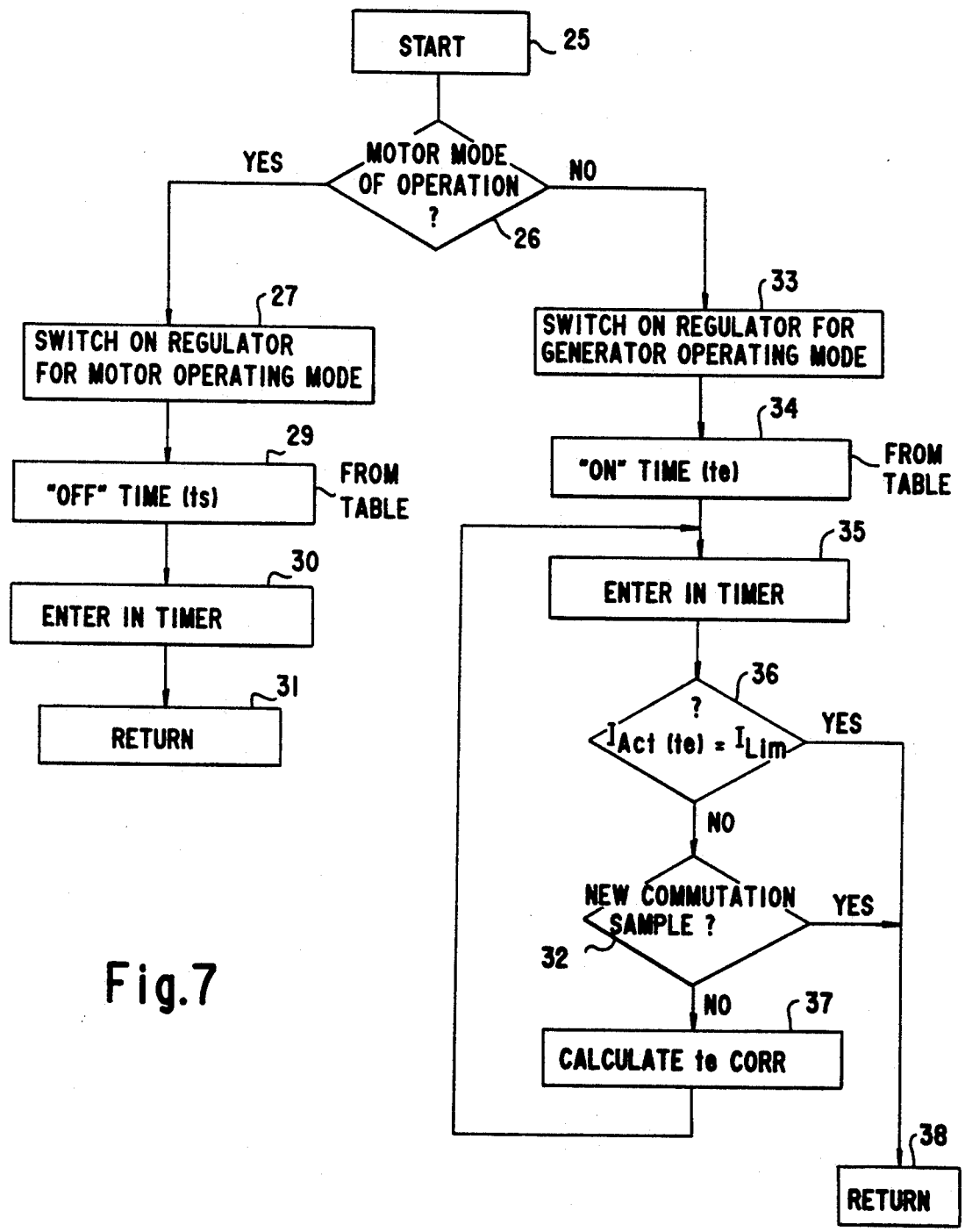

FIGS. 6a and 6b together are a block diagram of a d.c. drive for performing the method according to the invention; and FIG. 7 is a flow chart for driving the blocking device.

Figure 1A:
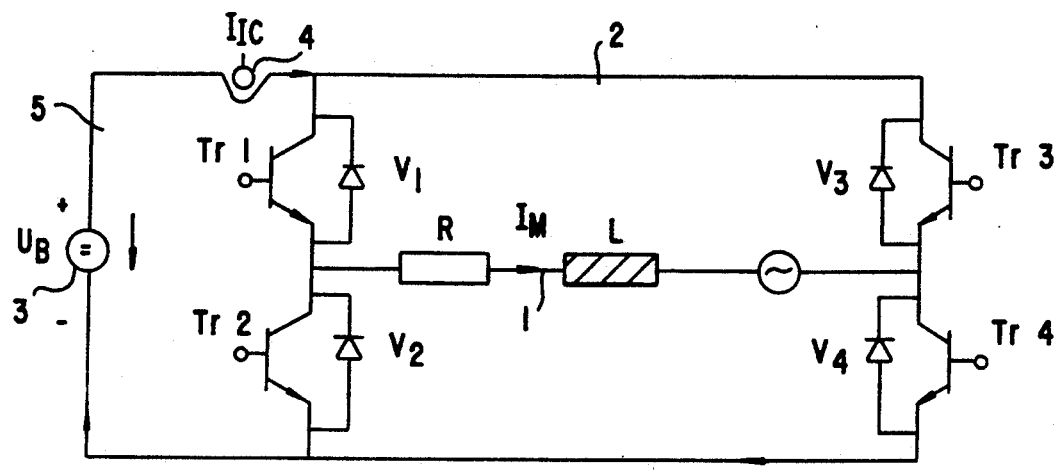
FIGS. 1a and 1b are circuit diagrams of an embodiment of a drive, in a motor mode of operation, for performing the method according to the invention, respectively during current build-up in FIG. 1a, and during current reduction in FIG. 1b.
Figure 1B:
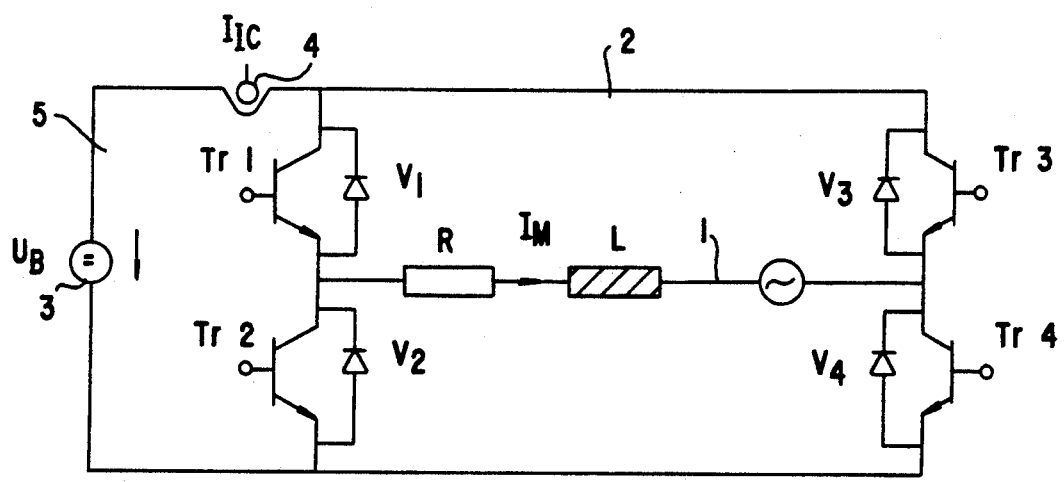

Referring now to the drawing and first, particularly, to FIGS. 1a and 1b, a circuit diagram of a drive for performing the method according to the invention is shown in a motor mode of operation. FIG. 1a represents the circuit during current build-up, and FIG. 1b shows the circuit during current reduction. The motor 1, which is represented by an equivalent network formed of a resistance R, an inductance L and an a.c. source, is driven via a d.c.-voltage intermediate-circuit converter 2. Individual bridge arms of the converter 2 are each formed by a respective power transistor Tr1 to Tr4 connected in parallel with a corresponding freewheeling diode V1 to V4.

In order to ensure exact functioning of the hereinafore-described current regulator, the motor current must be known at every moment. In this regard, it is indispensable that the motor current $I_M$ in each individual phase winding be measured. In order to recognize faults in the power section (e.g., a short circuit of a bridge), additional measurement of the current $I_{IC}$ in the d.c.-voltage intermediate circuit 5 should also not be omitted when performing this so-called multiple current measurement. Regulation or adjustment of the motor current $I_M$ to a given reference or nominal value $I_{Ref}$ was previously effected in a conventional manner in both operating modes by switching on and off, respectively, when the motor current reaches a lower or an upper current limit value.

In order to avoid the additional costs resulting from the use of several current-measuring devices 4, the method according to the invention is based upon the performance of a single current measurement in the d.c.-voltage intermediate circuit 5. A measuring device 4 suitable for the current measurement is described in German Published Non-Prosecuted Application (DE-OS) 37 08 892.

During motor mode operation, however, problems occur in the case of a single current measurement in the d.c.-voltage intermediate circuit 5 when only one transistor is clocked. It is true that, when the transistors Tr1 and Tr4 are switched into conducting state, the rise in the motor current $I_M$ is identical with the current $I_{IC}$ which is measured in the d.c.-voltage intermediate circuit 5. However, the measuring device 4 does not measure the dying or reducing current if the transistor Tr1 or Tr4 is switched into the non-conducting state when the reference value $I_{Ref}$ of the motor current is reached. The current $I_{IC}$ measured by the measuring device 4 in the d.c.-voltage intermediate circuit 5 is represented in FIG. 1e. The corresponding circuit during the current reduction is shown in FIG. 1b.

If the motor current $I_M$ reaches an upper limit value $I_{Ref}$, only one of the two transistors, namely, the transistor Tr4, in the case at hand, is switched off. The motor current $I_M$ dies out or reduces via the transistor Tr1 and the freewheeling diode V3, which is connected in parallel with the transistor Tr3. This type of drive does not produce any variations in the time rate of change of the current rise. However, the current reduction time becomes greater, because the current from the inductance L passes through a circuit which is closed via the transistor Tr1 and the freewheeling diode V3.

Figure 1C:
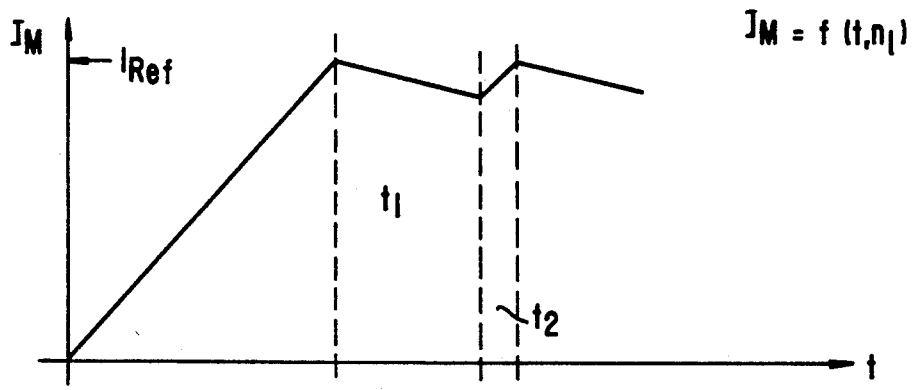
FIG. 1c is a plot diagram of the current variation in a phase winding in the lower rotational speed range for the motor mode of operation.
Figure 1D:
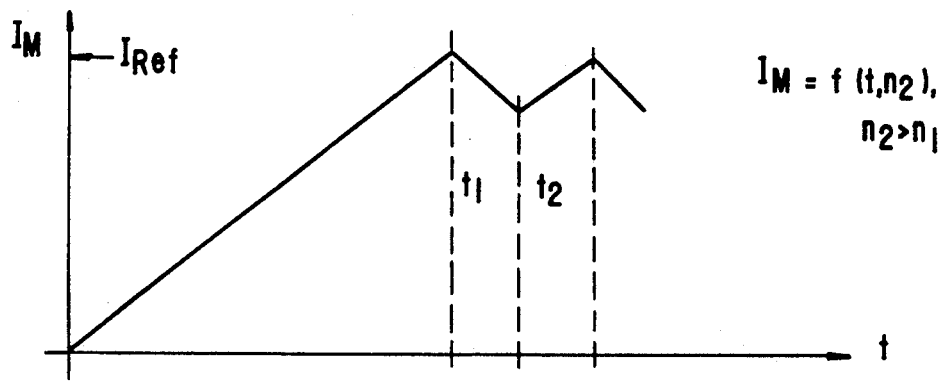
FIG. 1d is a plot diagram of the current variation in a phase winding in the upper rotational speed range for the motor mode of operation.
Figure 1E:
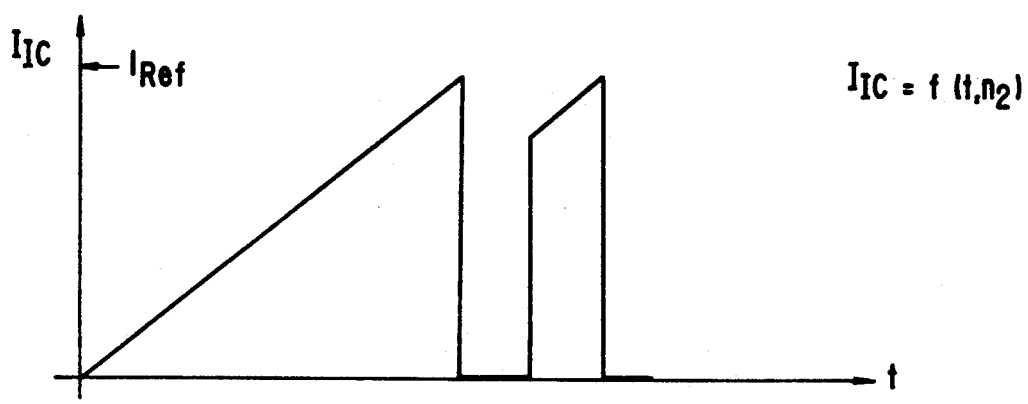
FIG. 1e is a plot diagram of the current variation in the d.c.-voltage intermediate circuit for the motor mode of operation.

FIG. 1c and 1d show the course or variation of the motor current $I_M$, which occurs when applying the method according to the invention. While the current build-up time becomes longer as the rotary speed of the motor increases, the reduction of the motor current $I_M$ as a result of the rising counter-voltage occurs more rapidly as the rotary speed increases, and the current reduction time decreases as the rotary speed increases. According to the invention, the "off" time for the transistors conducting the motor current is determined in dependence upon the rotary speed of the motor. The "off" time is thus variable over the entire rotary speed range of the motor and calculated so that the amount of ripple of the motor current $I_M$ and, therefore, of the torque, and also the switching frequency, are as low as possible. In FIG. 1c, which shows the course or variation of the current in the lower speed range, the selected "off" time is greater than that in FIG. 1d, which is a plot diagram of the course or variation of the current in the upper speed range. The hereinafore-described reciprocal dependence of the current reduction time upon the rotary speed is taken into account in determining the "off" times $t_1$ or $t_2$. In this case, it is necessary, however, to take into consideration the fact that the e.m.f. and the "off" time do not exhibit a linear dependence upon the entire rotary speed range. Very long blocking times result especially in the lower speed range, because the current dies only very slowly. If this dependence is not taken into consideration, there is a danger that the hold-off interval of the transistors might not be fully realized because of the selectively brief "on" time.

Figure 1F:
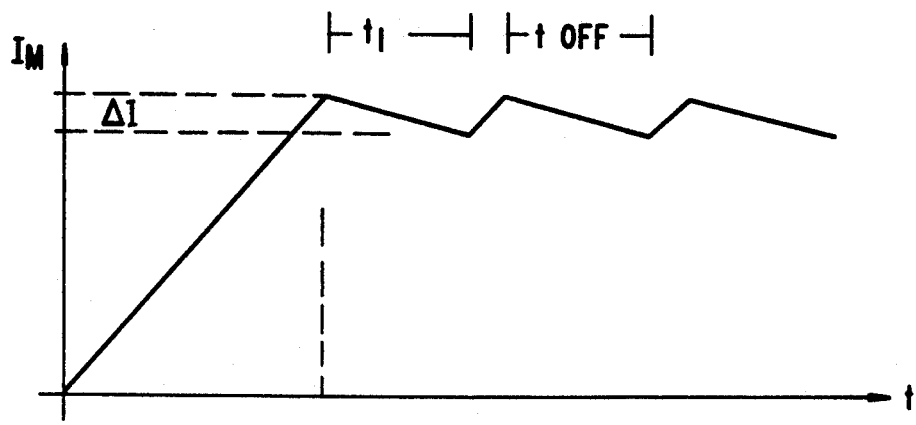
FIG. 1f is a plot diagram of the variation of the motor current after a start-up or after commutation in the motor mode of operation in accordance with a mode of the method according to the invention.
Figure 1G:
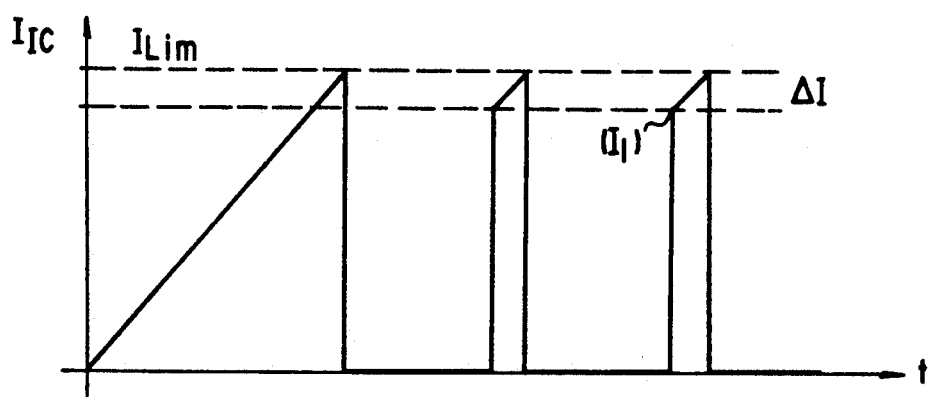
FIG. 1g is a plot diagram of the current variation in the d.c.-voltage intermediate circuit in the motor mode of operation in accordance with a mode of the method according to the invention.

FIG. 1f shows the course or variation in the motor current after a start or after commutation in the motor mode of operation in accordance with the method according to the invention. Regulation takes place in such a manner that constant hysteresis is achieved. If the motor current reaches the limit value $I_{Lim}$, one of the transistors of the energized bridge arms is blocked for a period of time t1 which is dependent upon the rotary speed of the motor. If the current $I_1$ measured at the switch-on time does not correspond with the motor current at the lower limit of the tolerance band I, a correction factor k is introduced and is taken into account in the determination of the next "off" time $t_s$. This permits an arrangement in which the motor current $I_M$ reaches the lower limit of the tolerance band or range I when the off-time $t_s$ expires.

Instead of constant hysteresis, it is also possible to adjust the method according to the invention to a smallest possible hysteresis value at maximum permissible frequency, the hysteresis value being determined in particular by the hold-off interval of the semiconductor valves.

Figure 2A:
FIG. 2a is a plot diagram of the current variation in a phase winding for a generator mode of operation.
Figure 2B:
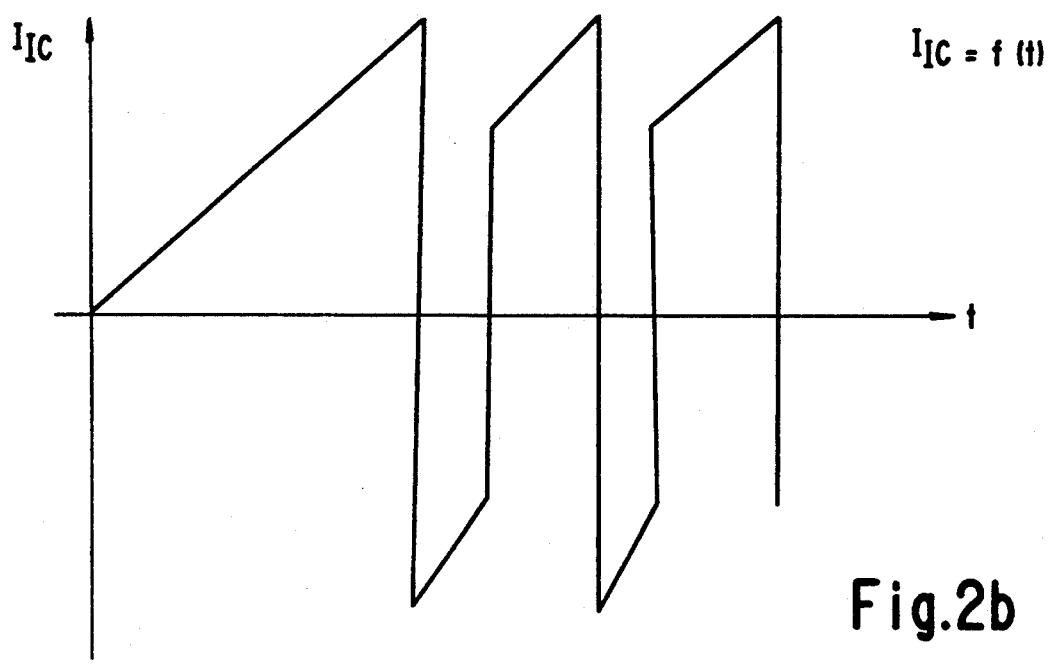
FIG. 2b is a plot diagram of the current variation in the d.c.-voltage intermediate circuit for the generator mode of operation.

FIG. 2a represents the course or variation of the motor current $I_M$ in a phase winding, while FIG. 2b shows the simultaneously measured current $I_{IC}$ in the d.c.-voltage intermediate circuit 5 for the generator mode of operation. Because, during the clocking of both transistors, the dying or reducing motor current $I_M$ flows back to the d.c. voltage source 3 via the measuring device 4 when the transistors are switched off, the amount of the current $I_{IC}$ measured in the d.c.-voltage intermediate circuit 5 corresponds with the motor current $I_M$ at all times. For this reason, it is further possible to regulate the motor current $I_M$ within the two fixed limit values of the current by means of a two-step controller.

Figure 3A:
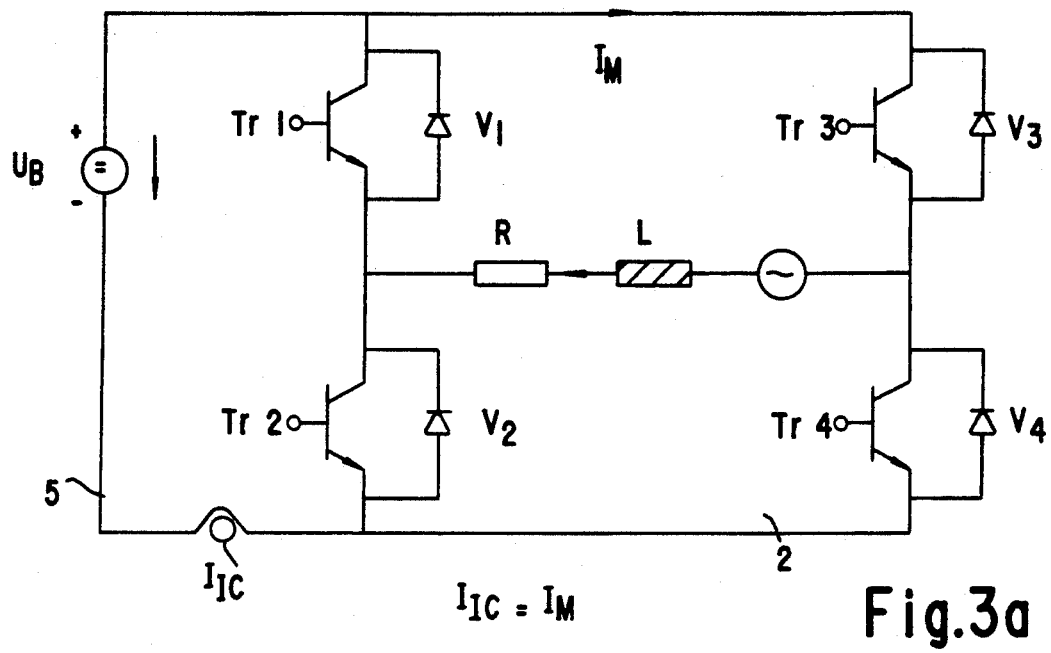
FIG. 3a is a circuit diagram of the embodiment of the drive for performing the method according to the invention during current build-up in the generator mode of operation.
Figure 3B:
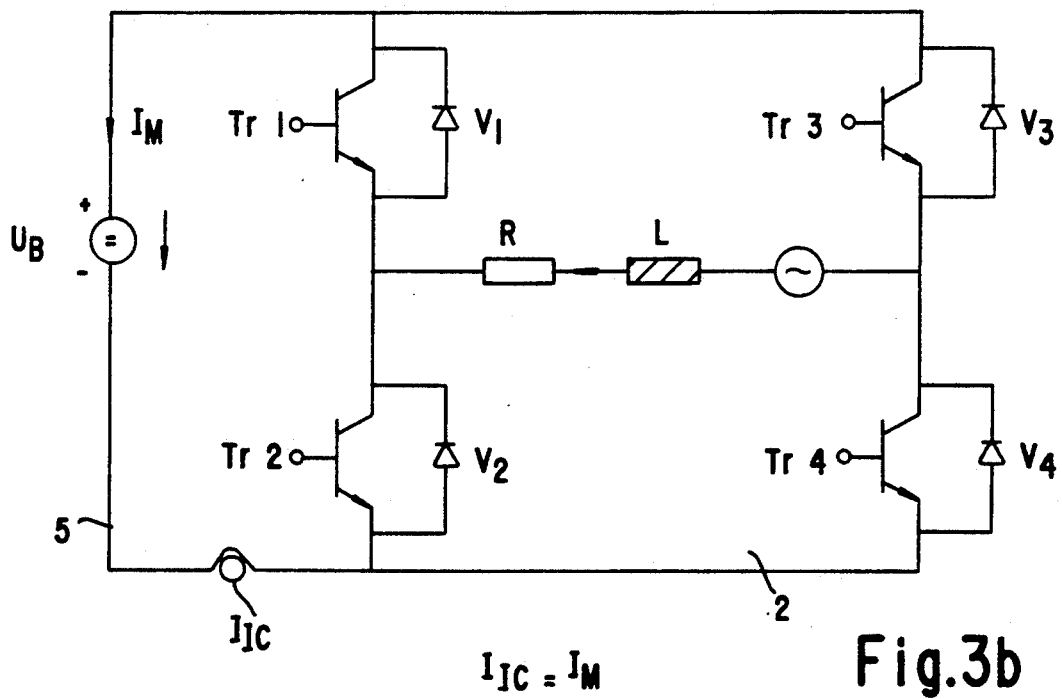
FIG. 3b is a circuit diagram of the embodiment of the drive for performing the method according to the invention during current reduction in the generator mode of operation.

FIG. 3a shows an embodiment of the circuit of the drive for performing the method according to the invention during current build-up in the generator mode of operation, while FIG. 3b represents the circuit of the drive embodiment during current reduction. The motor 1, which is represented as an equivalent network formed by the resistance R, the inductance L and an a.c. source, is driven via the d.c.-voltage intermediate-circuit converter 2 as in the motor mode of operation. Also in this case, the individual bridge arms of the converter 2 are each formed by the respective power transistors Tr1 to Tr4 with respective freewheeling diodes V1 to V4 connected in parallel therewith. Regulation or adjustment of the motor current $I_M$ to the given reference value $I_{Ref}$ is effected via the clocking of the transistors Tr1 to Tr4. According to a mode of the method according to the invention, the current build-up is not effected, for example, via the two transistors Tr3 and Tr2 in diagonal bridge arms, but rather via the transistor Tr3 and the freewheeling diode V1. The current $I_M$ flows in the "upper circuit" of the converter 2 shown in FIG. 3a. The current $I_M$ flowing in the motor is not measured by the current measuring device 4 in the d.c.-voltage intermediate circuit 5. For this reason, the current $I_{IC}$ measured in the intermediate circuit 5 for current regulation of the motor is not available during the current build-up. According to the invention, the transistor Tr3 is switched on for a period of time $t_e$ which is dependent upon the rotary speed of the motor and other parameters.

As represented in FIG. 3b, the clocked transistor Tr3 is also switched off in the current reduction phase. The current reduction is effected via the freewheeling diodes V4 and V1. During the current reduction phase, the motor current $I_M$ corresponds to the current $I_{IC}$ measured in the intermediate circuit 5. If the current $I_{IC}$ measured in the intermediate circuit 5 reaches the lower limit value, the transistor Tr3 of the energized bridge arm is switched on again for a period of time $t_e$ which is dependent upon the rotary speed of the motor.

Figure 4A:
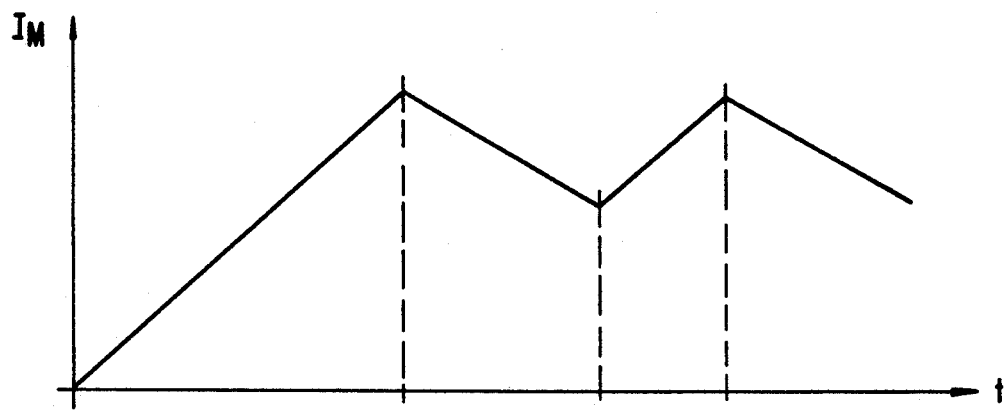
FIG. 4a is a plot diagram of the current variation in a phase winding for the generator mode of operation during clocking of a transistor.
Figure 4B:
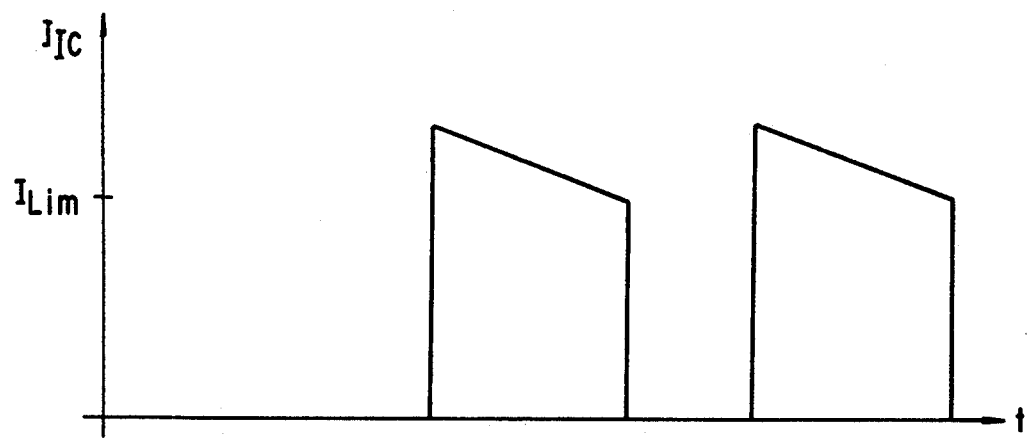
FIG. 4b is a plot diagram of the current variation in the d.c.-voltage intermediate circuit for the generator mode of operation during clocking of a transistor.

In FIGS. 4a and 4b, respectively, the motor current $I_M$ and the current $I_{IC}$ measured in the intermediate circuit, respectively, are shown plotted against time. As can be seen in FIG. 4b, the motor current $I_M$ is not measured in the d.c.-voltage intermediate circuit 5 during the current reduction phase, i.e. no actual value of the current $I_{Act}$ is present at the current regulations during the current buildup phases.

Figure 5A:
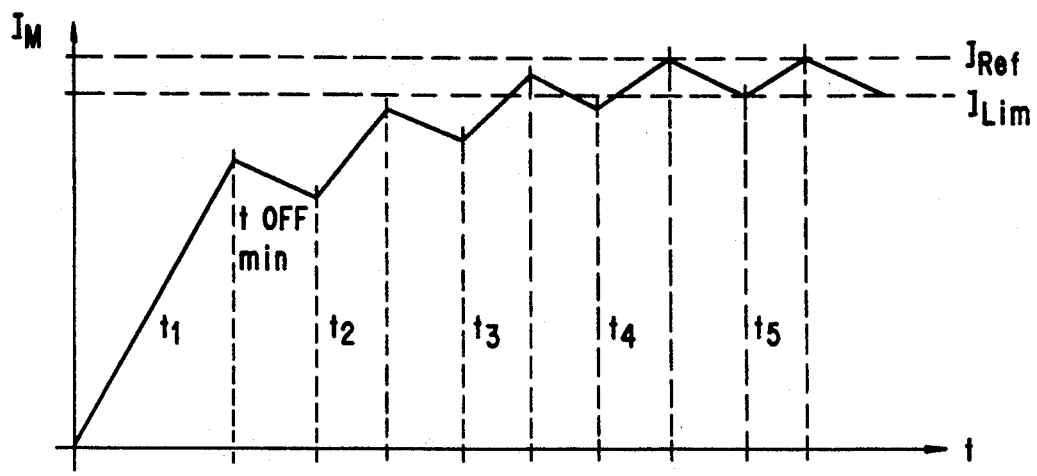
FIG. 5a is a plot diagram of the variation of the motor current after a start-up or after commutation in the generator mode of operation in accordance with a mode of the method according to the invention.

FIG. 5a shows the course or variation of the motor current $I_M$ with respect to time after the motor has been switched on and after commutation, respectively. During a first "on" phase of the transistor Tr3 of the energized bridge arm according to FIG. 3a, the current builds up. The time period $t_1$ is calculated so that the first actual value $I_{Act}$ of the current is approximately equal to the reference value $I_{Ref}$ of the motor current after the transistor Tr3 has been switched off. This value is stored in a computing device. In the event of a deviation or difference between the measured actual value $I_{Act}$ and the given reference value $I_{Ref}$ of the current, the clocked transistor, e.g. the transistor Tr3 according to FIG. 3a, is switched off for a minimum "off" time $t_{off\ min}$. This minimum off-time $t_{off\ min}$ is oriented with the hold-off interval of the transistor and is intended, when the reference value of the current is not reached, to prevent the clocked transistor of the energized bridge arm from being immediately switched on again, which would otherwise result in a considerable shortening of the service life thereof. After the expiration of this minimum off-time $t_{off\ min}$, the corresponding actual value of the current is again stored. If this measured actual value $I_{Act}$ deviates from the given reference value $I_{Ref}$ of the motor current, a corrected "on" time $t_2$ is computed by a computing device. If the actual value $I_{Act}$ of the motor current measured in the d.c.-voltage intermediate circuit at the switch-off time of the transistor Tr3 deviates from the given reference value $I_{Ref}$ of the motor current, the transistor is switched off again for a minimum "off" time $t_{off\ min}$. The following "on" time $t_3$ of the transistor Tr3 is corrected again, if necessary, and successively until the actual value $I_{Act}$ of the motor current measured at the switch-off time of the transistor Tr3 of the energized bridge arm corresponds with the reference value $I_{Ref}$ of the motor current. From this instant in time, the transistor Tr3 of the energized bridge arm is switched off respectively for the determined period of time $t_s$.

Figure 5B:
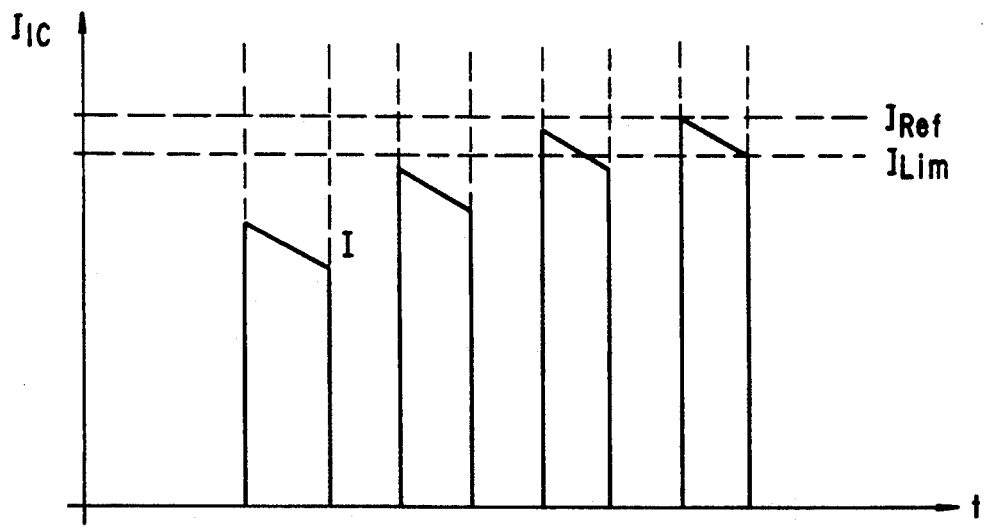
FIG. 5b is a plot diagram of the current variation in the d.c.-voltage intermediate circuit in the generator mode of operation in accordance with a mode of the method according to the invention.

For computing the "on" time, the computer device also takes into account the dependence of the motor current upon other parameters, for example, upon the inductance L of the motor, the resistance R of the motor, the motor temperature, the rotary speed-dependent e.m.f., as well as the given current tolerance I of the reference value $I_{Ref}$ of the motor current. FIG. 5b shows the current $I_{IC}$ measured in the intermediate circuit 5 during the clocking of the transistor T3 of the energized bridge arm.

FIGS. 6a and 6b together represent a block diagram of a brushless d.c. drive for implementing the method according to the invention. The drive includes the equivalent network of a brushless d.c. motor 1 with a permanently magnetic rotor and three phase windings. A rotor position transmitter 6, which delivers commutating signals determining commutation moments, is allocated to the d.c. motor 1 in a conventional manner. The d.c.-voltage intermediate-circuit converter 2 of the d.c. motor 1 is formed of a line-side rectifier module 8 and a load-side power stage 7. The power stage 7 is constructed as a three-phase current bridge. In the d.c.-voltage intermediate circuit 5 with an impressed d.c. voltage $U_{IC}$, the current in the d.c.-voltage intermediate circuit 5 is measured free of any potential by means of a current measuring device 4 (single current measurement in the d.c.-voltage intermediate circuit 5).

The digital signals of the rotor position transmitter 6 serve as the actual value of the rotary speed and are converted into an analog voltage by a device for cooperating the actual value of the speed (D/A converter) 9. Because no external tachometer for measuring the actual value of the speed is necessary, this is a very economical solution. The rotary speed setpoint is made available by the setpoint value 10. Speed control or regulation is effected in a conventional manner by means of a speed regulator 11 (usually a PI regulator), a current limiter 12 and a rectifier 13. The speed regulator 11 delivers the reference or nominal value of the motor current for the current regulations which forms the basis for the speed regulation.

As described hereinbefore, the actual value of the motor current is measured by means of a current measuring device 4 in the d.c.-voltage intermediate circuit 5. In the generator mode of operation a current regulator 14 acts as a two-step current regulator. If the motor current reaches the upper limit of the current-regulator hysteresis band, the power transistors of the power stage 7, which are energized according to the signals of a control logic 15 and a rotation reverser 16, are switched off. If the lower limit of the current-regulator hysteresis band is exceeded, they are switched on again.

Because a positive output voltage is constantly supplied to the current regulator because of the rectifier 13, a polarity change is signalled via a polarity recognition device 19 of the rotation reverser 16. The rotation reverser 16 then induces an appropriate reversal of the power transistors of the power stage 7 into the other operating mode. The connection of the rotation reverser 16 with the power stage 7 is effected via a blocking device 20 and a driver stage 17.

An electronic control unit 18 receives, as input signals, the reference value of the current, the actual value of the current, the information concerning the reference direction of rotation, and the signals of the rotor transmitter, from which the actual rotational speed and the actual direction of rotation are determined. The "off" $t_s$ is determined in the electronic control unit 18 by means of this information.

The calculated current-regulator "off" time is written into registers of a timer 21. The current regulator 14 receives information regarding the specific operating mode from the electronic control unit 18 via a control line 22; for example, the logical value "1" is present at the current regulator 14 in the generator mode of operation, and the logical value "0" is present thereat in the motor mode of operation.

If the control line 22 is set to "0", the current regulator 14 operates virtually free of hysteresis. A signal for clocking only one of the two semiconductor valves of the energized bridge arm reaches the driver stage 17. An "off" signal of the current regulator triggers the timer 21 via a control line 23. The triggering signal is delivered with the output signal of the timer 21 to an OR-element 24 which is connected to the blocking device 20. In accordance with the calculated "off" time $t_s$, a respective one of the two transistors of the energized bridge arms is switched off when the reference value $I_{Ref}$ of the motor-current is attained.

If the data line 22 is set to "1", the "off" time $t_s=0$ is delivered to the timer 21. The current regulator 14 then acts as a two-step current regulator with hysteresis: both transistors of the energized bridge arms are switched off when the upper limit value of the current is reached, and switched on when the lower limit value of the current is attained.

With the illustrated embodiment of FIGS. 6a and 6b, the method according to the invention is practiced wherein both transistors are clocked in the generator mode of operation. This method is useful if the motor usually runs in the motor operating mode and is only driven briefly in the generator operating mode at switch-off. In this case, a loud noise occurs only temporarily during braking and is therefore not very disturbing. If, on the other hand, one of the drives runs constantly in the generator operating mode, the noise generation by this motor determines the noise level. In this case, the clocking of only one semiconductor valve in the generator mode of operation proves to be extremely advantageous.

FIG. 7 presents a flow chart for driving the blocking device 20 for the motor as well as for the generator modes of operation. The drive is effected via the electronic control unit 18 according to FIGS. 6a and 6b.

The program is started at 25 when a new actual value of the rotary speed of the motor is available. At 26, a decision is made whether the motor mode of operation or the generator mode of operation is present. If the drive operates in the motor operating mode, the regulator for the motor operating mode is switched on at 27. At 29, the "off" time $t_s$ is loaded from a table and, at 30 is entered into the timer 21, after which the program returns at 31 to start 25.

If the drive operates in the generator mode of operation, the regulator for the generator mode of operation is switched on at 33. Then the "on" time $t_e$ is calculated at 34. This "on" time $t_e$, like the "off" time $t_s$, is not dependent only upon the speed in the motor mode; to calculate the "on" time $t_s$ or the "off" time $t_s$, account may also be taken of the dependence of these values on the inductance L of the motor, the resistance R of the motor, the temperature T of the motor or, for example, the current tolerance I of the reference value $I_{Ref}$ of the current. At 35, the "on" time $t_e$ is entered from a table into the timer 21. At 36, a test is performed to determine whether the actual value of the current corresponds with the limit value $I_{Lim}$ of the motor current $I_M$ after the "on" time $t_e$ has expired. If this is not the case, a corrected "on" time $t_{e\,corr}$ is calculated at 37, and this is entered into the timer 21 again at 35. If a new commutation sample or model should be provided at 32, the program is returned directly at 38 to the start 25. Otherwise, the foregoing steps are performed successively until the actual value of the current corresponds with the limit value $I_{Lim}$ of the motor current $I_M$ after the corrected time $t_{e\,corr}$ has expired. If this correspondence has been reached, or if a new actual value $n_{Act}$ of the rotary speed of the motor is available, the program returns to the start 25 at 38.

We claim:

1. Method for regulating a motor current in phase windings of a brushless d.c. motor, which comprises the steps of applying current to the phase windings individually via an electronically controllable converter connected to a d.c.-voltage intermediate circuit and having switchable semiconductor valves and respective freewheeling diodes connected in parallel with each semiconductor valve in individual bridge arms, measuring an actual value of the motor current exclusively in the d.c.-voltage intermediate circuit, controlling the rotational speed of the motor as a function of the motor current, wherein controlling the motor speed as a function of the motor current is performed by means of a two-step current regulator, switching off, in a motor mode of operation, only one switchable semiconductor valve of the energized bridge arms for a first period of time dependent upon the rotational speed of the motor when a reference value of the motor current is reached, and switching on, in a generator mode of operation, only one of the switchable semiconductor valves of the energized bridge arms for a second period of time dependent upon the rotational speed of the motor.

2. Method according to claim 1, which further includes the step of switching off, in a generator mode of operation, both switchable semiconductor valves in the energized bridge arms, when the reference value of the motor current is reached.

3. Method according to claim 1, which further includes the step of determining the first period of time and the second period of time, respectively, in dependence upon further operating-mode parameters of the motor.

4. Method according to claim 1, which further includes the step of calculating the second period of time after the motor has been switched on or, after commutation, so that a first measurable actual value of the motor current is as close as possible to the reference value of the motor current.

5. Method according to claim 4, which still further includes the step of switching off the switchable semiconductor valves of the energized bridge arms for a minimum off-time.

6. Method according to claim 1, which includes, during respective commutations, the step of alternately switching off and switching on the switchable semiconductor valves of the energized bridge arms for respective motor and generator modes of operation.

7. Method for regulating a motor current in phase windings of a brushless d.c. motor, which comprises the steps of applying current to the phase windings individually via an electronically controllable converter connected to a d.c.-voltage intermediate circuit and having switchable semiconductor valves and respective freewheeling diodes connected in parallel with each semiconductor valve in individual bridge arms, measuring an actual value of the motor current exclusively in the d.c.-voltage intermediate circuit, switching off, in a motor mode of operation, only one switchable semiconductor valve of the energized bridge arms for a first period of time dependent upon the rotational speed of the motor when a reference value of the motor current is reached, and switching on, in a generator mode of operation, only one of the switchable semiconductor valves of the energized bridge arms for a second period of time dependent upon the rotational speed of the motor, and including switching off, at the expiration of the second period of time, the switchable semiconductor valve of the energized bridge arms, storing the actual value of the motor current measured in the intermediate circuit, comparing the actual value of the motor current with a reference value of the motor current and, when the actual value and the reference value of the motor current are different, determining a correction value and including said correction value in a calculation of a subsequent corrected on-time period of the switchable semiconductor valve of the energized bridge arms.

8. Method according to claim 7, which further includes the step of switching on the switchable semiconductor valves of the energized bridge arms for the corrected on-time period when a previously determined lower limit value is reached.

9. Method for regulating a motor current in phase windings of a brushless d.c. motor, which comprises the steps of applying current to the phase windings individually via an electronically controllable converter connected to a d.c.-voltage intermediate circuit and having switchable semiconductor valves and respective freewheeling diodes connected in parallel with each semiconductor valve in individual bridge arms, measuring an actual value of the motor current exclusively in the d.c.-voltage intermediate circuit, switching off, in a motor mode of operation, only one switchable semiconductor valve of the energized bridge arms for a first period of time dependent upon the rotational speed of the motor when a reference value of the motor current is reached, and switching on, in a generator mode of operation, only one of the switchable semiconductor valves of the energized bridge arms for a second period of time dependent upon the rotational speed of the motor, and producing a commutation point between the generator mode of operation and the motor mode of operation corresponding to a lower rotational speed in the generator mode range other than $n=0$ RPM.

10. Method for regulating a motor current in phase windings of a brushless d.c. motor, which comprises the steps of applying current to the phase windings individually via an electronically controllable converter connected to a d.c.-voltage intermediate circuit and having switchable semiconductor valves and respective freewheeling diodes connected in parallel with each semiconductor valve in individual bridge arms, measuring an actual value of the motor current exclusively in the d.c.-voltage intermediate circuit, switching off, in a motor mode of operation, only one switchable semiconductor valve of the energized bridge arms for a first period of time dependent upon the rotational speed of the motor when a reference value of the motor current is reached, and switching on, in a generator mode of operation, only one of the switchable semiconductor valves of the energized bridge arms for a second period of time dependent upon the rotational speed of the motor, wherein respective first and second pairs of the bridge arms are connected in parallel, and which includes alternately building-up the current via a first circuit including a semiconductor valve of one of the bridge arms and a freewheeling diode of the other of the bridge arms of said first pair of bridge arms, and via a second circuit including semiconductor valve of one of the bridge arms and a freewheeling diode of the other of the bridge arms of said second pair of bridge arms.

* * * * *